3,063,963
STABILIZED POLYMERS OF VINYLIDENE CHLORIDE OR VINYL CHLORIDE CONTAINING A SULFUR COMPOUND AND A TIN COMPOUND
Willis C. Wooten, Jr., and Joel M. Grossman, Kingsport, Tenn., assignors to Eastman Kodak Company, Rochester, N.Y., a corporation of New Jersey
No Drawing. Filed Oct. 13, 1958, Ser. No. 766,651
10 Claims. (Cl. 260—45.75)

This invention relates to stabilized vinyl-type synthetic resins derived from a substantial proportion of mono-olefinic monomers containing halogen, e.g. vinyl chloride and/or vinylidene chloride.

It is an object of this invention to provide halogen-containing vinyl-type synthetic resins containing a novel synergistic combination of stabilizers whereby improved resistance to ultraviolet radiation, weathering and heat is achieved.

Other objects will become apparent elsewhere in this specification, especially as set forth in the claims.

According to one embodiment of this invention there is provided a stablized synthetic resin comprising a polymer of from 25-100% by weight of a monomer selected from the group consisting of vinyl chloride and vinylidene chloride and from 0 to 75% by weight of at least one other mono-olefinically unsaturated polymerizable monomer and synergistically coacting stabilizers consisting of (A) from 0.025 to 3% by weight of said polymer of a sulfur compound selected from the group consisting of compounds having the following formulas:

$$HS-C_pH_{2p}-COOH$$
$$HS-C_mH_{2m}-OH$$

wherein $p$ is an integer of from 1 to 20 and $m$ is an integer of from 2 to 20 and (B) a dialkyl tin aliphatic acid salt selected from the group consisting of compounds having the following formulas:

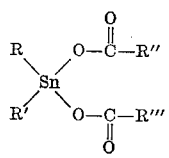

and

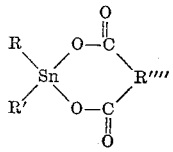

wherein R, R', R" and R''' each represents a monovalent hydrocarbon radical containing from 1 to 12 carbon atoms and R'''' represents a divalent hyrocarbon radical containing from 1 to 18 carbon atoms, the proportion by weight of stabilizer (B) being at least twice the weight of stabilizer (A) and the total percent of (A) plus (B) is from about 0.02 to 5% based on the weight of the polymer.

According to a preferred embodiment the proportion by weight of the tin compound stabilizer (B) is at least five times the weight of the sulfur compound stabilizer (A).

The synthetic resins which can be stabilized according to this invention include the following polymers which may or may not be mixed with other stabilizers, additives, flameproofing agents, dyes, pigments, etc:

(a) Homopolymer of vinyl chloride,
(b) Homopolymer of vinylidene chloride,
(c) Copolymers of vinyl chloride and acrylonitrile,
(d) Copolymers of vinylidene chloride and acrylonitrile,
(e) Copolymers of vinylidene chloride, acrylonitrile and N-isopropylacrylamide,
(f) Copolymers of vinyl chloride and vinyle acetate,
(g) Copolymers of vinyl chloride, acrylonitrile and N-butyrylacrylamide,
(h) Copolymers of vinyl chloride, methyl methacrylate and vinyl acetate,
(i) Copolymers of vinyl chloride or vinylidene chloride with acrylonitrile and N-vinylpyridine,
(j) Copolymers of vinyl chloride or vinylidene chloride with acrylonitrile mixed with a homopolymer of an N-alkylacrylamide (e.g. N-isopropylacrylamide, N-octylacrylamide, etc.),
(k) Copolymers of vinyl chloride or vinylidene chloride with acrylonitrile mixed with a homopolymer or copolymer of α-vinylpyrrolidone,
(l) Copolymers of vinyl chloride or vinylidene chloride with acrylonitrile mixed with copolymers of an N-alkylacrylamide and acrylonitrile,
(m) Other copolymers and mixtures of homopolymers or copolymers of vinyl chloride and/or vinylidene chloride with or without other mono-olefinically unsaturated polymerizable monomers containing from 2 to 20 or more carbon atoms, especially those containing from 2 to 8 carbon atoms and no more than one nitrogen atom and no more than 2 oxygen atoms.

The methods for preparing the synthetic resins described above are well known and such methods and a great variety of such synthetic resins are described in the prior art. These synthetic resins are useful in preparing fibers, films, molding compositions, coating materials, wrapping materials, electrical insulation, fabrics, rope, plastic pipe, paints, laminating materials for safety glass, adhesives, etc. However, the preferreed synthetic resins as stabilized in accordance with this invention are especially advantageous in synthetic fibers and products made therefrom such as rugs, wearing apparel, draperies, seat covers, upholstery, rope, cigarette filters, etc. Resistance to weathering (e.g. moisture and ultraviolet light) is especially important for items exposed to out of doors conditions. Resistance to ultraviolet light is also important for rugs, draperies, automobile seat covers, porch furniture upholstery and the like which may receive considerable sunlight. A number of synthetic fibers are in commercial production today which would be of greatly improved value if they had greater resistance to heat, light, hydrolytic action and other factors relating to normal exposure to the conditions of use. One of the objects of this invention is to accomplish such an improvement for the particular class of synthetic resin fibers with which this invention is concerned.

Preferred sulfur compounds within the defined group called stabilizer (A) include thioglycollic acid, mercaptoethanol, omega-mercaptoalkanoic acids such as mercaptopropionic acid, mercaptolauric acid, mercaptohexadecanoic acid, etc., omega-mercaptoalkanols such as mercaptopropanol, mercaptoisopropanol, mercaptolauryl alcohol, mercaptodecanol, etc., especially such stabilizer (A) compounds as contain from 2 to 6 carbon atoms. In addition to these preferred compounds, the related compounds such as dilauryl sulfide, thioacetamide, dilauryl 3,3'-thiodipropionate and many other similar sulfur compounds are of possible use as partial replacements for the preferred stabilizer (A) as defined above. Such sulfur compounds can be depicted as having formulas such as X—S—Y, X—S—S—Y or X=S wherein X or Y are hydrogen or organic radicals.

Preferred tin compounds within the defined group called stabilizer (B) include dibutyl tin dilaurate, diethyl tin maleate, dihexyl tin dilaurate, dibutyl tin maleate, diethyl tin succinate, dilauryl tin dicaproate, dioctadecyl tin distearate, dilauryl tin dioleate, etc., especially such stabilizer (B) compounds where R and R' each contain from 1 to 6 carbon atoms, R'' and R''' each contain from 6 to 18 carbon atoms and R'''' contains from 2 to 8 carbon atoms. In addition to these preferred compounds, the related compound such as diethyl tin diethoxide, dibutyl tin dithioethoxide, etc. and many other similar tin compounds are of possible use as partial replacements for the preferred stabilizer (B) as defined above. Such tin compounds can be depicted as having the following formula:

wherein $R_1$ and $R_2$ are aryl or alkyl groups such as ethyl, butyl, hexyl, phenyl, tolyl, naphthyl, etc. and wherein $R_3$ and $R_4$ are acid, alcohol, mercaptan, thioacid or other groups such as acetate ethoxide, thioethoxide, thioacetate, etc.

One of the most essential features of this invention is the requirement that stabilizer (A) and stabilizer (B) must be used in conjunction with each other. Neither of these stabilizers are effective alone to accomplish the desired results even at relatively high concentrations.

The stabilizers can be mixed with the synthetic resin polymer in any convenient way. They can be milled into the polymer on rolls. They can be added to a solution of the polymer. They can be dissolved in a solvent and the solution sprayed onto particles of the polymer, which particles can then be melted and extruded. Other techniques are also obvious.

The following examples will serve to further illustrate preferred embodiments of this invention but are not to be considered as limiting the scope of the invention to any degree less than as set forth in the claims.

An acetone solution containing 25% of a copolymer composed of 50% vinylidene chloride and 50% acrylonitrile with an inherent viscosity of 1.15, and containing a tin compound, and a sulfur compound as shown in the table below was formed into fibers by a conventional dry spinning technique. The fiber was then drafted a factor of five on a hot roll and subjected to heating at 150° C. for ten minutes.

The white fiber was then exposed in an Atlas Weather-Ometer for 20 hours. The result of these tests are tabulated below.

| Item No. | Tin Compound | Sulfur Compound | Fiber Color |
|---|---|---|---|
| 1 | None | None | Dark brown. |
| 2 | 1.0% Dibutyltin dilaurate | ___do___ | Brown. |
| 3 | ___do___ | .2% Thioglycollic acid | White. |
| 4 | None | ___do___ | Brown. |
| 5 | ___do___ | .60% Thioglycollic acid | Do. |
| 6 | .60% Dibutyltin dilaurate | None | Do. |
| 7 | ___do___ | .1% 2-Mercaptoethanol | White. |
| 8 | .60% Dibutyltin | ___do___ | Do. |

Items 3, 7 and 8 show the results of practicing the invention. Items 2, 4, 5 and 6 demonstrate that neither stabilizer alone is effective.

An especially preferred embodiment of this invention employs the combination of thioglycollic acid and dibutyl tin maleate. It has quite unexpectedly been found that thioglycollic acid as a color inhibitor without dibutyl tin maleate does not give ultraviolet stability and, conversely, dibutyl tin maleate without thioglycollic acid won't work satisfactorily.

The Atlas Weather-Ometer is a well known device made by Atlas Electric Devices Co. of Chicago and provides controlled ultraviolet light, temperature and moisture so as to simulate natural weathering conditions on an accelerated scale.

The results achieved by this invention are peculiar to synthetic resinous polymers which contain a substantial proportion of a polymer of a monoethylenically unsaturated compound containing at least one halogen atom (e.g. vinyl chloride or vinylidene chloride). The synergistic results of this invention have no known relationship with regard to other classes of polymers, e.g. cellulose acetate, rubber, synthetic rubber, polyethylene, polyethylene terephthalate, nylon, polyvinyl acetate, polyurethanes, polyepoxides, etc.

Although the examples given above describe an especially preferred embodiment of this invention it is apparent that other tin compounds and other sulfur compounds can be employed to achieve similar results as described. Moreover, a great variety of polymers of the class described can be stabilized according to this invention as illustrated by items $a$ through $m$ set forth hereinabove. For example data similar to that set forth above was obtained by testing various samples of a copolymer of about 50 parts of vinylidene chloride and 50 parts of acrylonitrile blended with from 0 to 15 parts of a polymer of N-isopropylacrylamide, the latter polymer including copolymers of N-isopropylacrylamide and acrylonitrile. A number of other such polymers can also be likewise stabilized according to this invention involving the synergistic combination in the defined class of polymers.

The invention has been described in detail with particular reference to preferred embodiments thereof, but it will be understood that variations and modifications can be effected within the spirit and scope of the invention as described hereinabove and as defined in the appended claims.

We claim:

1. A stabilized synthetic resin comprising a polymer of from 25–100% by weight of a monomer selected from the group consisting of vinyl chloride and vinylidene chloride and from 0 to 75% by weight of at least one other mono-olefinically unsaturated polymerizable monomer and synergistically coacting stabilizers consisting of (A) from 0.025 to 3% by weight of said polymer of a sulfur compound selected from the group consisting of compounds having the following formulas:

$$HS-C_pH_{2p}-COOH$$

$$HS-C_mH_{2m}-OH$$

wherein $p$ is an integer of from 1 to 20 and $m$ is an integer of from 2 to 20 and (B) a dialkyl tin aliphatic acid salt selected from the group consisting of compounds having the following formulas:

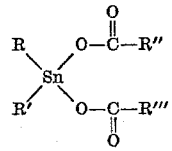

and

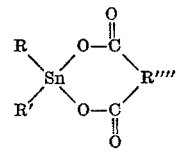

wherein R, R', R'', and R''' each represents a monovalent hydrocarbon radical containing from 1 to 12 carbon atoms and R'''' represents a divalent hydrocarbon radical containing from 1 to 18 carbon atoms, the proportion by weight of stabilizer (B) being at least twice the weight of stabilizer (A) and the total amount of (A) plus (B) is not less than present in a stabilizing amount.

2. A stabilized synthetic resin as defined by claim 1 wherein stabilizer (A) is thioglycollic acid and stabilizer (B) is dibutyltin dilaurate.

3. A stabilized synthetic resin as defined by claim 1 wherein stabilizer (A) is thioglycollic acid and stabilizer (B) is dibutyltin maleate.

4. A stabilized synthetic resin as defined by claim 1 wherein stabilizer (A) is 2-mercaptoethanol and stabilizer (B) is dibutyltin dilaurate.

5. A stabilized synthetic resin as defined by claim 1 wherein stabilizer (A) is 2-mercaptoethanol and stabilizer (B) is dibutyltin maleate.

6. A stabilized synthetic resin as defined by claim 1 wherein the synthetic resin is a copolymer of a mixture of monomers comprising about 50 parts by weight of vinylidene chloride and about 50 parts by weight of acrylonitrile.

7. A stabilized synthetic resin as defined by claim 6 wherein stabilizer (A) is thioglycollic acid and stabilizer (B) is dibutyltin dilaurate.

8. A stabilized synthetic resin as defined by claim 6 wherein stabilizer (A) is thioglycollic acid and stabilizer (B) is dibutyltin maleate.

9. A stabilized synthetic resin as defined by claim 6 wherein stabilizer (A) is 2-mercaptoethanol and stabilizer (B) is dibutyltin dilaurate.

10. A stabilized synthetic resin as defined by claim 6 wherein stabilizer (A) is 2-mercaptoethanol and stabilizer (B) is dibutyltin maleate.

References Cited in the file of this patent

UNITED STATES PATENTS

| | | |
|---|---|---|
| 2,592,926 | Mack et al. | Apr. 15, 1952 |
| 2,707,178 | Wilson | Apr. 26, 1955 |

FOREIGN PATENTS

| | | |
|---|---|---|
| 771,857 | Great Britain | Apr. 3, 1957 |